United States Patent
Yanagisawa

(10) Patent No.: US 12,529,850 B2
(45) Date of Patent: Jan. 20, 2026

(54) OPTICAL CONNECTOR

(71) Applicant: SHINKO ELECTRIC INDUSTRIES CO., LTD., Nagano (JP)

(72) Inventor: Kenji Yanagisawa, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 266 days.

(21) Appl. No.: 18/524,688

(22) Filed: Nov. 30, 2023

(65) Prior Publication Data
US 2024/0192450 A1 Jun. 13, 2024

(30) Foreign Application Priority Data
Dec. 8, 2022 (JP) .................. 2022-196163

(51) Int. Cl.
*G02B 6/38* (2006.01)
(52) U.S. Cl.
CPC ......... *G02B 6/3885* (2013.01); *G02B 6/3861* (2013.01)
(58) Field of Classification Search
CPC .................................................. G02B 6/3885
See application file for complete search history.

(56) References Cited

U.S. PATENT DOCUMENTS

| | | | | |
|---|---|---|---|---|
| 2008/0096140 A1* | 4/2008 | Hasegawa | ............... | G02B 6/43 430/324 |
| 2012/0195562 A1* | 8/2012 | Tsujita | ............... | G02B 6/138 427/163.2 |
| 2014/0301700 A1 | 10/2014 | Matsubara et al. | | |
| 2015/0370015 A1 | 12/2015 | Aoki | | |
| 2016/0377816 A1* | 12/2016 | Barwicz | ............... | G02B 6/3885 385/49 |
| 2017/0097474 A1* | 4/2017 | Barwicz | ............... | G02B 6/3885 |
| 2019/0113691 A1* | 4/2019 | Konegawa | ........... | G02B 6/3883 |
| 2020/0249400 A1* | 8/2020 | Konegawa | ............... | G02B 6/13 |

FOREIGN PATENT DOCUMENTS

| | | | | |
|---|---|---|---|---|
| JP | 2007-272159 A | * | 10/2007 | |
| JP | 2007-298689 A | * | 11/2007 | |
| JP | 2010-231092 A | * | 10/2010 | |
| JP | 2011-2709 A | * | 1/2011 | |
| JP | 2013-029624 | | 2/2013 | |
| JP | 2016-004224 | | 1/2016 | |

* cited by examiner

*Primary Examiner* — Michael Stahl
(74) *Attorney, Agent, or Firm* — IPUSA, PLLC

(57) ABSTRACT

An optical connector includes a holding member to which a waveguide member is fixed. The waveguide member includes a first clad layer having a longitudinal direction and a first surface, a core layer provided on the first surface, a second clad layer provided on the first surface and covering the core layer, and first and second contact layers provided on the first surface, sandwiching the core layer in a cross sectional view perpendicular to the longitudinal direction and exposed from the second clad layer. The first contact layer includes a second surface making contact with the first surface, and a third surface opposite to the second surface, and the second contact layer includes a fourth surface making contact with the first surface, and a fifth surface opposite to the second surface. The first clad layer includes sixth and seventh surfaces forming obtuse angles with the first surface.

8 Claims, 9 Drawing Sheets

OPTICAL CONNECTOR

CROSS-REFERENCE TO RELATED APPLICATIONS

This application is based upon and claims priority to Japanese Patent Application No. 2022-196163, filed on Dec. 8, 2022, the entire contents of which are incorporated herein by reference.

FIELD

Certain aspects of the embodiments discussed herein are related to optical connectors, and methods for manufacturing optical connectors.

BACKGROUND

An example of a known optical connector includes a PMT optical connector.

Examples of related art include Japanese Laid-Open Patent Publication No. 2013-029624, and Japanese Laid-Open Patent Publication No. 2016-004224.

A high accuracy is required of the optical connector so as to transmit an optical signal. In the conventional optical connector, high-precision work is required in order to perform position alignment with a high accuracy. For example, in a case where the optical connector having a single mode optical waveguide is to be manufactured, complicated work is required, such as using a high-magnification optical instrument.

SUMMARY

Accordingly, it is an object in one aspect of the embodiments of the present disclosure to provide an optical connector and a method for manufacturing the optical connector, which can simply obtain a high alignment accuracy.

According to one aspect of the embodiments of the present disclosure, an optical connector includes a waveguide member; and a holding member to which the waveguide member is fixed, wherein the waveguide member includes a first clad layer having a longitudinal direction and a first surface, a core layer provided on the first surface, a second clad layer provided on the first surface and covering the core layer, and a first contact layer and a second contact layer provided on the first surface, sandwiching the core layer therebetween in a cross sectional view perpendicular to the longitudinal direction, and exposed from the second clad layer, the first contact layer includes a second surface making contact with the first surface, and a third surface opposite to the second surface, the second contact layer includes a fourth surface making contact with the first surface, and a fifth surface opposite to the second surface, the first clad layer includes a sixth surface, on a side of the first contact layer viewed from the second clad layer, continuous with the first surface, and forming an obtuse angle with the first surface, and a seventh surface, on a side of the second contact layer when viewed from the second clad layer, continuous with the first surface, and forming an obtuse angle with the first surface, and the holding member includes an eighth surface making direct contact with the third surface, a ninth surface making direct contact with the fifth surface, a tenth surface making direct contact with the sixth surface, and an eleventh surface making direct contact with the seventh surface.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

Figure 1A:
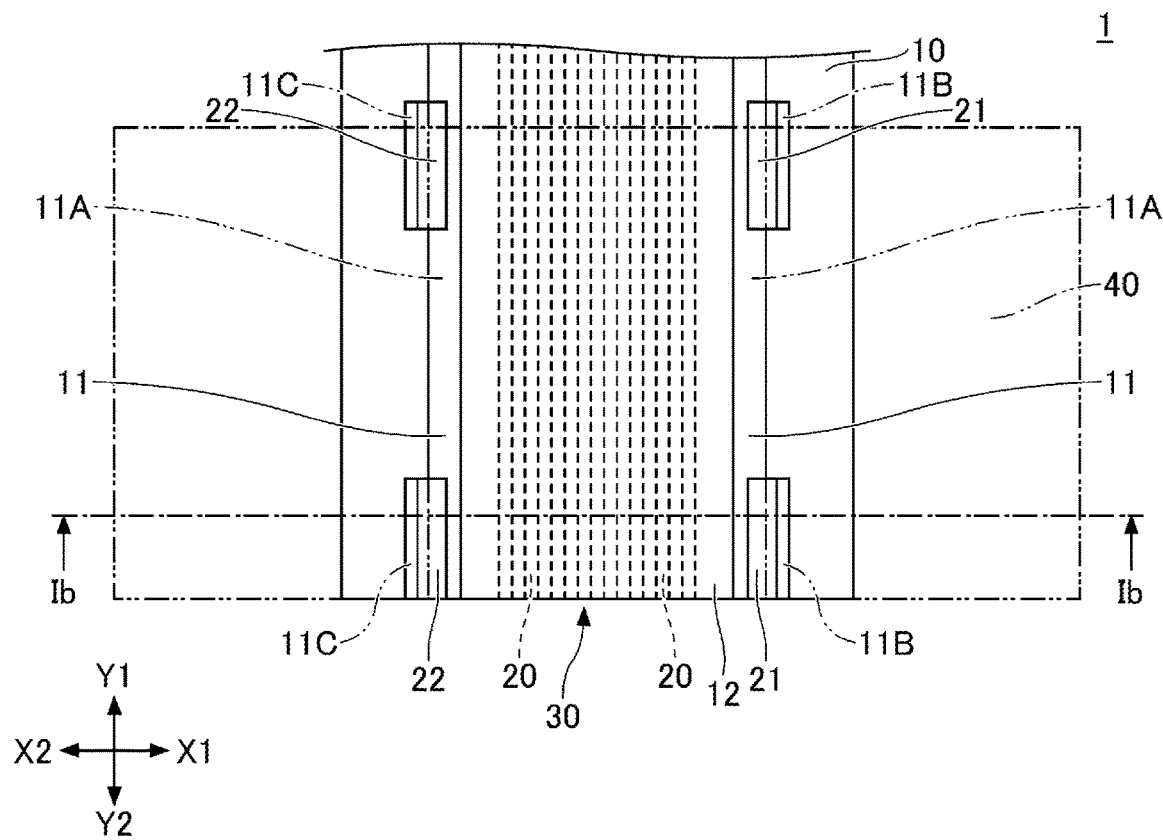
FIG. 1A and FIG. 1B are diagrams illustrating an example of an optical connector according to one embodiment.

Preferred embodiments of the present disclosure will be described with reference to the accompanying drawings. In the present specification and the drawings, those constituent elements having substantially the same functional configuration are designated by the same reference numerals, and a repeated description of the same constituent elements may be omitted. Moreover, in the present disclosure, an X1-X2 direction, a Y1-Y2 direction, and a Z1-Z2 directions are mutually perpendicular directions. An XY-plane includes the X1-X2 direction and the Y1-Y2 direction, a YZ-plane includes the Y1-Y2 direction and the Z1-Z2 direction, and a ZX-plane includes the Z1-Z2 direction and the X1-X2 direction. For the sake of convenience, the Z1-Z2 direction is assumed to be the up-down (or vertical) direction, the Z1 side is assumed to be an upper side, and the Z2 side is assumed to be a lower side. Further, a plan view of an object refers to a view of the object viewed from the Z1 side, and a planar shape of the object refers to a shape of the object in the plan view viewed from the Z1 side. An optical connector may be used in an upside-down state, or at an inclined state inclined at an arbitrary angle.

Configuration of Optical Connector

Figure 1B:
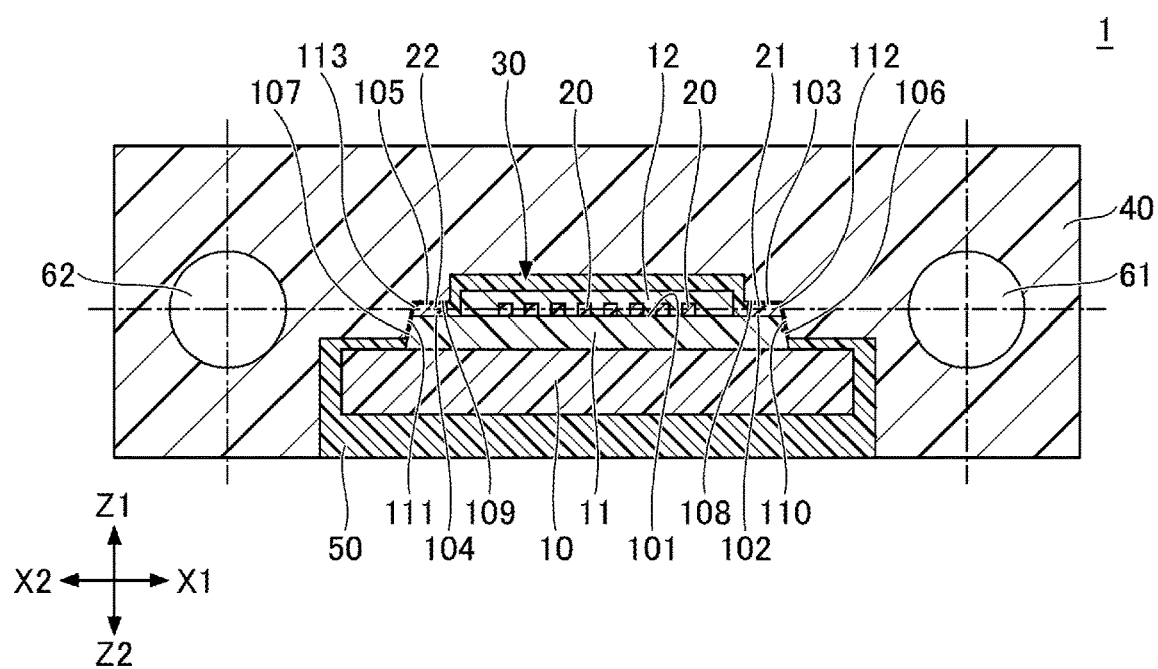
Figure 2:
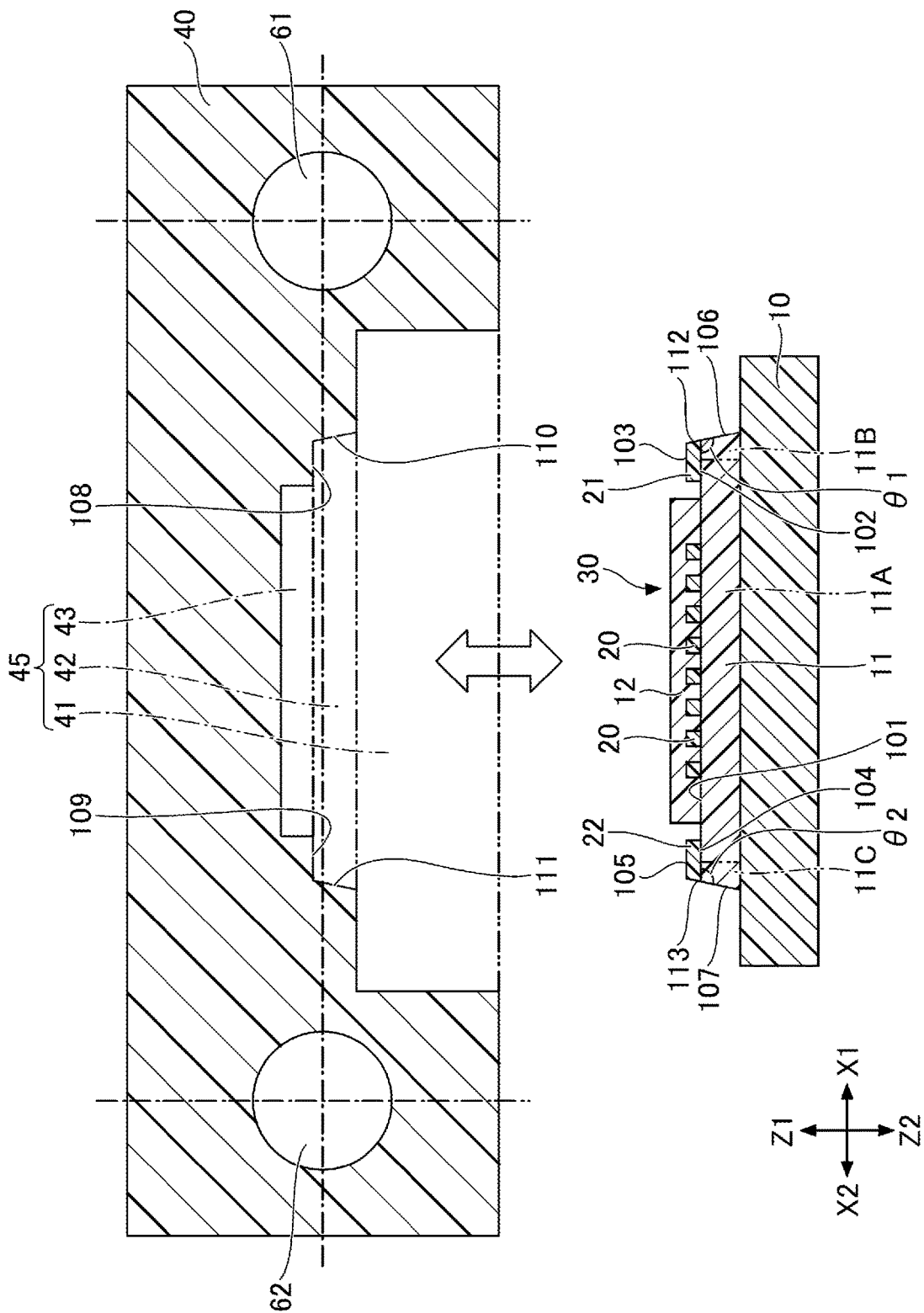
FIG. 2 is a disassembled cross sectional view illustrating the example of the optical connector according to one embodiment.

First, a configuration of the optical connector according to one embodiment will be described. FIG. 1A and FIG. 1B are diagrams illustrating an example of the optical connector according to one embodiment. FIG. 1A illustrates a plan view of the optical connector, and FIG. 1B illustrates a cross sectional view of the optical connector along a line Ib-Ib in FIG. 1A. FIG. 1A illustrates a perspective of a holding member. FIG. 2 is a disassembled cross sectional view illustrating the example of the optical connector according to one embodiment. The illustration of an adhesive is omitted in FIG. 1B and FIG. 2.

As illustrated in FIG. 1A, FIG. 1B, and FIG. 2, an optical connector 1 according to one embodiment mainly includes a waveguide member 30, a holding member 40, and an adhesive 50. The waveguide member 30 and the holding member 40 are fixed to each other by the adhesive 50.

The waveguide member 30 includes a substrate 10, a lower clad layer 11, a core layer 20, an upper clad layer 12, a first contact layer 21, and a second contact layer 22.

The substrate 10 is a printed wiring board, for example. The substrate 10 has an upper surface on the Z1 side, and a lower surface on the opposite side from the upper surface, that is, on the Z2 side. The upper surface and the lower surface of the substrate 10 are parallel to the XY-plane. The substrate 10 extends in the Y1-Y2 direction, and a longitudinal direction of the substrate 10 is parallel to the Y1-Y2 direction. For example, the substrate 10 has a thickness of 0.8 mm along the Z1-Z2 direction, a width of 2.8 mm along the X1-X2 direction, and a length of 10 mm or greater along the Y1-Y2 direction.

The lower clad layer 11 is provided on the upper surface of the substrate 10. The lower clad layer 11 is made of a resin. The lower clad layer 11 has one surface 101 on the Z1 side, and another surface on an opposite side from the one surface 101, that is, on the Z2 side. The one surface 101 and the other surface of the lower clad layer 11 are parallel to the XY-plane. For example, the lower clad layer 11 has a thickness of 50 μm along the Z1-Z2 direction. The lower clad layer 11 includes a base portion 11A, two first contact areas 11B, and two second contact areas 11C. The lower clad layer 11 is an example of a first clad layer. The one surface 101 is an example of a first surface of the lower clad layer 11.

The base portion 11A extends parallel to the Y1-Y2 direction, and a longitudinal direction of the base portion 11A is parallel to the Y1-Y2 direction. For example, the base portion 11A has a width of 2.4 mm along the X1-X2 direction, and a length of 10 mm or greater along the Y1-Y2 direction.

The first contact area 11B is located on the X1 side of the base portion 11A, and connects to the base portion 11A. The second contact area 11C is located on the X2 side of the base portion 11A, and connects to the base portion 11A. The first contact area 11B includes a side surface 106 connecting to the one surface 101 and the other surface of the lower clad layer 11. The second contact area 11C includes a side surface 107 connecting to the one surface 101 and the other surface of the lower clad layer 11. The side surface 106 is located on the X1 side of the side surface 107, and the side surface 107 is located on the X2 side of the side surface 106. The side surface 106 and the side surface 107 are inclined from the ZX-plane. The side surface 106 and the side surface 107 form obtuse angles with the one surface 101 of the lower clad layer 11, and form acute angles with the other surface of the lower clad layer 11. For example, an interior angle θ1 between the one surface 101 and the side surface 106 is 97°, and an interior angle θ2 between the one surface 101 and the side surface 107 is 97°. The side surface 106 is an example of a sixth surface, and the side surface 107 is an example of a seventh surface.

The first contact area 11B has a width slightly less than 0.1 mm along the X1-X2 direction, and a length of 0.5 mm or greater along the Y1-Y2 direction. One of the two first contact areas 11B has an end surface that coincides with an end side on the Y2 side of the substrate 10. The other of the two first contact areas 11B is located on the Y1 side of the one of the two first contact areas 11B.

The second contact area 11C has a width slightly less than 0.1 mm along the X1-X2 direction, and a length of 0.5 mm or greater along the Y1-Y2 direction. One of the two second contact areas 11C has an end surface that coincides with an end surface on the Y2 side of the substrate 10. The other of the two second contact areas 11C is located on the Y1 side of the one of the two second contact areas 11C.

For example, one pair of the first contact area 11B and the second contact area 11C is arranged in the X1-X2 direction, and the other pair of the first contact area 11B and the second contact area 11C is arranged in the X1-X2 direction.

The core layer 20 is provided on the one surface 101 of the lower clad layer 11. A plurality of core layers 20 may be provided on the one surface 101 of the lower clad layer 11. The core layer 20 is provided on the one surface 101 of the base portion 11A. The core layer 20 is made of a resin. A refractive index of the core layer 20 is higher than a refractive index of the lower clad layer 11. The core layer 20 has one surface on the Z1 side, and another surface on the Z2 side. The one surface and the other surface of the core layer 20 are parallel to the XY-plane. The core layer 20 has two side surfaces continuous with the one surface and the other surface thereof. The two side surfaces of the core layer 20 are parallel to the ZX-plane. The core layer 20 extends parallel to the Y1-Y2 direction, and a longitudinal direction of the core layer 20 is parallel to the Y1-Y2 direction. The core layer 20 has an end surface that coincides with the end surface of the substrate 10 on the Y2 side. For example, the core layer 20 has a thickness of 5 μm along the Z1-Z2 direction, a width of 5 μm along the X1-X2 direction, and a length of 10 mm or greater along the Y1-Y2 direction.

The first contact layer 21 is provided on the one surface 101 of the lower clad layer 11. The first contact layer 21 is provided on the one surface 101 of the base portion 11A and the first contact area 11B. The first contact layer 21 is made of a resin. A refractive index of the first contact layer 21 is higher than the refractive index of the lower clad layer 11.

The first contact layer 21 has one surface 103 on the Z1 side, and another surface 102 on the Z2 side. The other surface 102 makes direct contact with the one surface 101 of the lower clad layer 11. The first contact layer 21 has one side surface 112 on the X1 side continuous with the one surface 103 and the other surface 102, and another side surface on the X2 side. The one side surface 112 of the first contact layer 21 is inclined from the ZX-plane. The other side surface of the first contact layer 21 is parallel to the ZX-plane. The side surface 112 forms an obtuse angle with the one surface 103, and forms an acute angle with the other surface 102. For example, an interior angle between the one surface 103 and the side surface 112 is 97°. The first contact layer 21 provided on the first contact area 11B on the Y2 side has an end surface that coincides with the end surface of the substrate 10 on the Y2 side. The other surface 102 of the first contact layer 21 is an example of a second surface, and the one surface 103 of the first contact layer 21 is an example of a third surface. The side surface 112 of the first contact layer 21 is an example of a twelfth surface.

For example, the first contact layer 21 has a thickness of 5 μm along the Z1-Z2 direction, and the one surface 103 has a width of 0.2 mm along the X1-X2 direction. The first contact layer 21 provided on the first contact area 11B on the Y1 side has a length of 0.5 mm along the Y1-Y2 direction, and the first contact layer 21 provided on the first contact area 11B on the Y2 side has a length slightly less than 0.5 mm along the Y1-Y2 direction.

The second contact layer 22 is provided on the one surface 101 of the lower clad layer 11. The second contact layer 22 is provided on the one surface 101 of the base portion 11A and the second contact area 11C. The second contact layer 22 is made of a resin. A refractive index of the second contact layer 22 is higher than the refractive index of the lower clad layer 11.

The second contact layer 22 has one surface 105 on the Z1 side, and another surface 104 on the Z2 side. The other surface 104 of the second contact layer 22 makes direct contact with the one surface 101 of the lower clad layer 11. The second contact layer 22 has one side surface 113 on the X2 side, and another side surface on the X1 side, which are continuous with the one surface 105 and the other surface 104 thereof. The one side surface 113 of the second contact layer 22 is inclined from the ZX-plane. The other side surface of the second contact layer is parallel to the ZX-plane. The side surface 113 forms an obtuse angle with the one surface 103, and forms an acute angle with the other surface 102. For example, the interior angle between the one surface 103 and the side surface 113 is 97°. The second contact layer 22 provided on the second contact area 11C on the Y2 side has an end surface that coincides with the end surface of the substrate 10 on the Y2 side. The surface 104 of the second contact layer 22 is an example of a fourth surface, and the surface 105 of the second contact layer 22 is an example of a fifth surface. The side surface 113 of the second contact layer 22 is an example of a thirteenth surface.

For example, the second contact layer 22 has a thickness of 5 µm along the Z1-Z2 direction, and the one surface 105 has a width of 0.2 mm along the X1-X2 direction. The second contact layer 22 provided on the second contact area 11C on the Y1 side has a width of 0.5 mm along the Y1-Y2 direction, and the second contact layer 22 provided on the second contact area 11C on the Y2 side has a width slightly less than 0.5 mm along the Y1-Y2 direction.

The first contact layer 21 and the second contact layer 22 sandwich the core layer 20 in a cross sectional view perpendicular to the longitudinal direction. The side surface 112 of the first contact layer 21 may coincide with the side surface 106 of the lower clad layer 11, and the side surface 113 of the second contact layer 22 may coincide with the side surface 107 of the lower clad layer 11.

A distance between the side surface on the X1 side of the core layer 20 that is located closest to the X1 side among the plurality of core layers 20, and the side surface on the X2 side of the core layer 20 that is located closest to the X2 side among the plurality of core layer 20 is 1.76 mm, for example. In addition, a distance between the side surface of the first contact layer 21 on the X2 side and the side surface of the second contact layer 22 on the X1 side is 1.9 mm, for example.

The upper clad layer 12 is provided on the one surface 101 of the lower clad layer 11. The upper clad layer 12 covers the core layer 20. At least a portion of the first contact layer 21 and at least a portion of the second contact layer 22 are exposed from the upper clad layer 12. The upper clad layer 12 is made of a resin. For example, a refractive index of the upper clad layer 12 is equal to the refractive index of the lower clad layer 11, and is lower than the refractive index of the core layer 20. The lower clad layer 11 has one surface on the Z1 side, and another surface on the Z2 side. The one surface and the other surface of the lower clad layer 11 are parallel to the XY-plane. The upper clad layer 12 has an end surface that coincides with the end surface of the substrate 10 on the Y2 side. For example, the upper clad layer 12 has a thickness of 20 µm along the Z1-Z2 direction, a width of 1.8 mm along the X1-X2 direction, and a length of 10 mm or greater along the Y1-Y2 direction. The upper clad layer 12 is an example of a second clad layer.

The holding member 40 has a three-dimensional rectangular parallelepiped shape. The holding member 40 has a thickness along the Z1-Z2 direction greater than a thickness of the waveguide member 30, and a width along the X1-X2 direction greater than a width of the waveguide member 30. Further, in the plan view, the holding member 40 has a length along the Y1-Y2 direction such that the holding member 40 overlaps the two first contact layers 21 and the two second contact layers 22. The holding member 40 is made of a resin, for example. The holding member 40 has an end surface that coincides with the end surface of the substrate 10 on the Y2 side.

As illustrated in FIG. 2, a groove 45 for accommodating the waveguide member 30 is formed in a surface of the holding member 40 on the Z2 side. The groove 45 extends parallel to the Y1-Y2 direction. The groove 45 includes concave portions 41, 42, and 43.

The concave portion 41 has an opening on the Z2 side connected to the outside. The concave portion 41 has an inner wall surface parallel to the ZX-plane, and a bottom surface parallel to the XY-plane, for example. A width of the concave portion 41 along the X1-X2 direction is greater than the width of the waveguide member 30.

The concave portion 42 has an opening on the Z2 side connected to a bottom of the concave portion 41. The concave portion 42 has bottom surfaces 108 and 109 parallel to the XY-plane, and inner wall surfaces 110 and 111 inclined from the ZX-plane. The bottom surfaces 108 and 109 are arranged on the same plane. The bottom surface 108 is located on the X1 side of the bottom surface 109, and the bottom surface 109 is located on the X2 side of the bottom surface 108. The inner wall surface 110 is located on the X1 side of the inner wall surface 111, and the inner wall surface 111 is located on the X2 side of the inner wall surface 110. A depth of the concave portion 42 is greater than a sum of the thickness of the lower clad layer 11 and the thickness of the first contact layer 21, and is greater than a sum of the thickness of the lower clad layer 11 and the thickness of the second contact layer 22.

The inner wall surface 110 forms an obtuse angle with the bottom surface 108, and the inner wall surface 111 forms an obtuse angle with the bottom surface 109. For example, the angle formed by the inner wall surface 110 and the bottom surface 108 is 97°, and the angle formed by the inner wall surface 111 and the bottom surface 109 is 97°. A distance between the inner wall surface 110 and the inner wall surface 111 is a distance at which the side surface 106 makes direct contact with the inner wall surface 110 and the side surface 107 makes direct contact with the inner wall surface 111, when the surface 103 of the first contact layer 21 makes direct contact with the bottom surface 108 and the surface 105 of the second contact layer 22 makes direct contact with the bottom surface 109. The bottom surface 108 is an example of an eighth surface, and the bottom surface 109 is an example of a ninth surface. The inner wall surface 110 is an example of a tenth surface, and the inner wall surface 111 is an example of an eleventh surface.

The concave portion 43 has an opening on the Z2 side connected to a bottom of the concave portion 42. The concave portion 43 has an inner wall surface parallel to the ZX-plane, for example. A width of the concave portion 43 along the X1-X2 direction is greater than the width of the upper clad layer 12.

The holding member 40 is formed with through holes 61 and 62 extending in parallel to the Y1-Y2 direction. The through hole 61 is provided on the X1 side of the groove 45, and the through hole 62 is provided on the X2 side of the groove 45. The through holes 61 and 62 have a circular shape in a cross section perpendicular to the longitudinal direction. A position of a center of each of the through holes 61 and 62 in the Z1-Z2 direction coincides with a position of a center of each of the core layers 20 in the Z1-Z2 direction, for example.

The waveguide member 30 is accommodated inside the groove 45. The surface 103 of the first contact layer 21 makes direct contact with the bottom surface 108 of the concave portion 42, and the surface 105 of the second contact layer 22 makes direct contact with the bottom surface 109 of the concave portion 42. In addition, the side surface 106 of the lower clad layer 11 makes direct contact with the inner wall surface 110 of the concave portion 42, and the side surface 107 of the lower clad layer 11 makes direct contact with the inner wall surface 111 of the concave portion 42. The side surface 112 of the first contact layer 21 may make direct contact with the inner wall surface 110 of the concave portion 42, and the side surface 113 of the second contact layer 22 may make direct contact with the inner wall surface 111 of the concave portion 42. The adhesive 50 is provided inside the groove 45, and the waveguide member 30 is fixed to the holding member 40 by the adhesive 50.

[Method for Manufacturing Optical Connector]

Next, a method for manufacturing the optical connector according to one embodiment will be described. FIG. 3A through FIG. 9B are diagrams illustrating the method for manufacturing the optical connector according to one embodiment. FIG. 3A, FIG. 4A, FIG. 5A, FIG. 6A, FIG. 7A, FIG. 8A, and FIG. 9A are plan views, and FIG. 3B, FIG. 4B, FIG. 5B, FIG. 6B, FIG. 7B, FIG. 8B, and FIG. 9B are cross sectional views. FIG. 3B, FIG. 4B, FIG. 5B, FIG. 6B, FIG. 7B, FIG. 8B, and FIG. 9B correspond to cross sectional views taken along a line Ib-Ib in FIG. 3A, FIG. 4A, FIG. 5A, FIG. 6A, FIG. 7A, FIG. 8A, and FIG. 9A, respectively. In FIG. 8A and FIG. 9A illustrate a perspective of the holding member 40, and the illustration of the adhesive 50 is omitted.

Figure 3A:
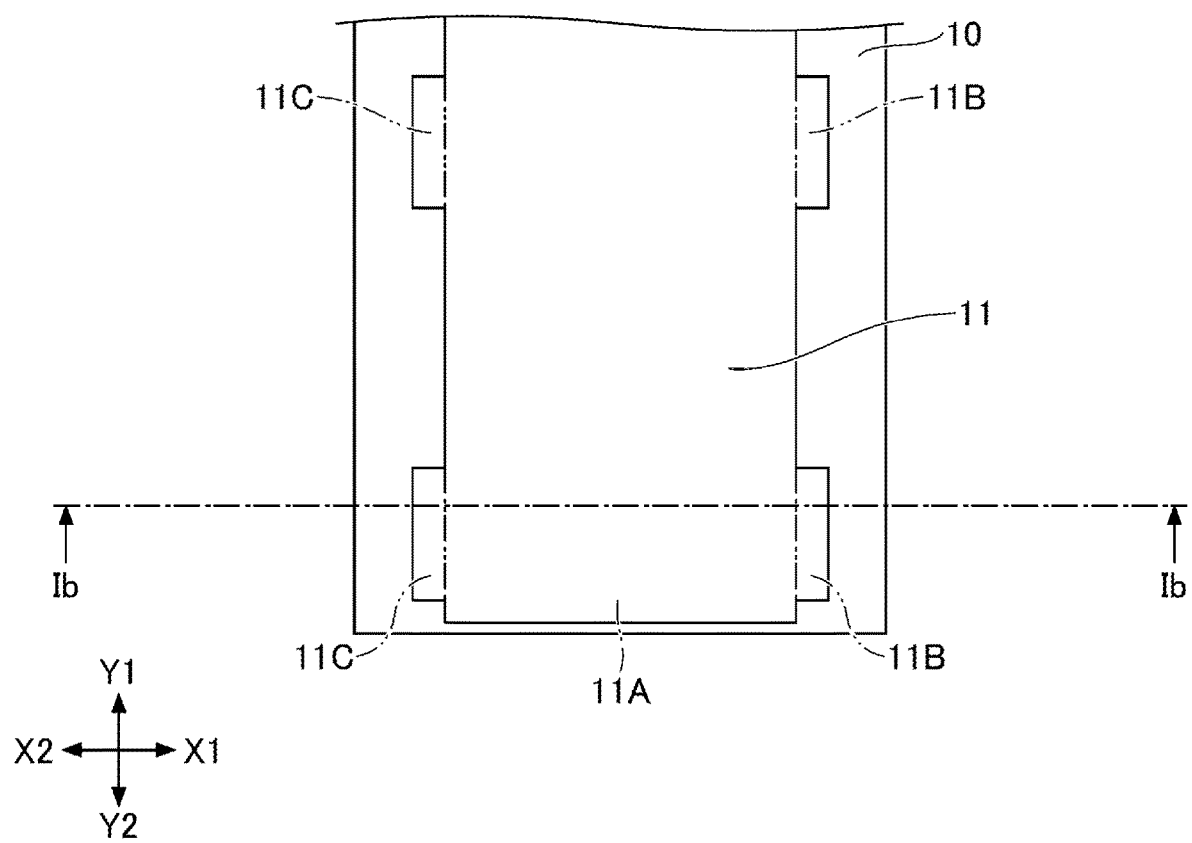
FIG. 3A and FIG. 3B are diagrams (part 1) illustrating an example of a method for manufacturing the optical connector according to one embodiment.
Figure 3B:
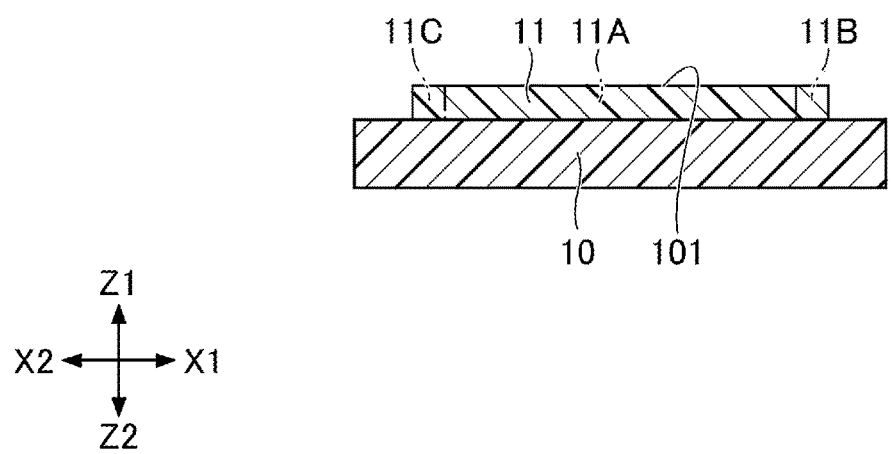

First, as illustrated in FIG. 3A and FIG. 3B, the substrate 10 is prepared, and the lower clad layer 11 is formed on one surface of the substrate 10. The lower clad layer 11 can be formed by coating, exposing, and developing a resin, for example. The lower clad layer 11 includes the base portion 11A, the two first contact areas 11B, and the two second contact areas 11C. At this point in time, both the side surface of the first contact area 11B on the X1 side and the side surface of the second contact area 11C on the X2 side are parallel to the ZX-plane, and both the widths of the first contact area 11B and the second contact area 11C are 0.1 mm. In addition, the end surface of the lower clad layer 11 on the Y2 side is closer to the Y1 than the end surface of the substrate 10 on the Y2 side.

Figure 4A:
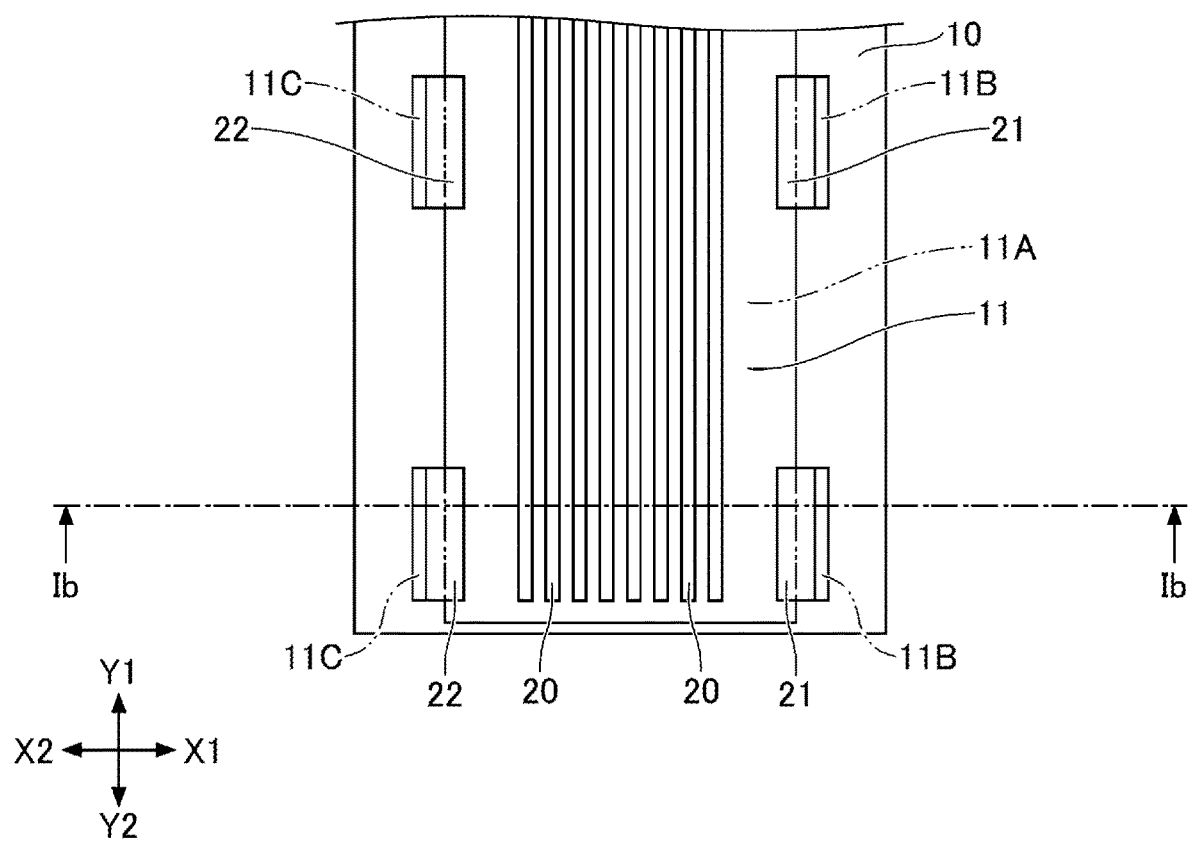
FIG. 4A and FIG. 4B are diagrams (part 2) illustrating the example of the method for manufacturing the optical connector according to one embodiment.
Figure 4B:
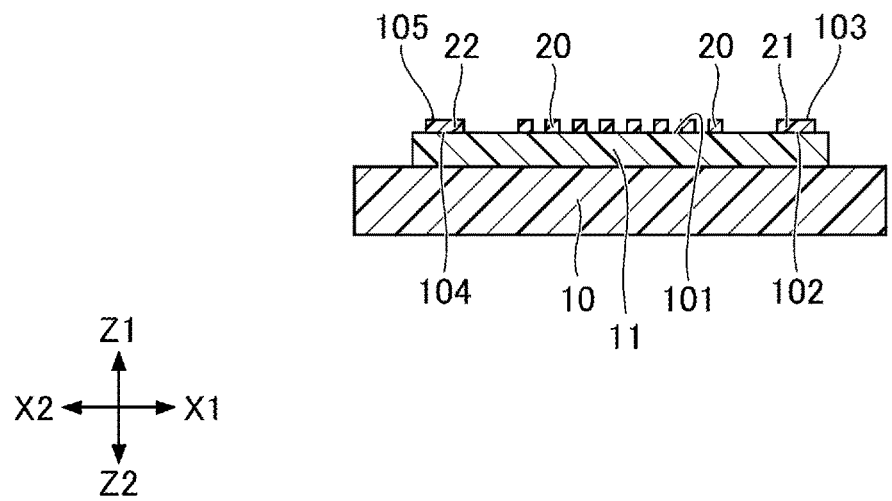

Next, as illustrated in FIG. 4A and FIG. 4B, the core layer 20, the first contact layer 21, and the second contact layer 22 are formed on the one surface 101 of the lower clad layer 11. The core layer 20, the first contact layer 21, and the second contact layer 22 can be formed by coating, exposing, and developing a resin, for example. The first contact layer 21 and the second contact layer 22 sandwich the core layer 20 in a cross sectional view perpendicular to the longitudinal direction of the lower clad layer 11. At this point in time, the side surface of the first contact layer 21 on the X1 side and the side surface of the second contact layer 22 on the X2 side are both parallel to the ZX-plane, and both the widths of the first contact layer 21 and the second contact layer 22 are 0.3 mm. In addition, the end surfaces of the core layer 20, the first contact layer 21, and the second contact layer 22 on the Y2 side are closer to the Y1 side than the end surface of the base portion 11A of the lower clad layer 11 on the Y2 side, and closer to the Y1 side than the end surface of the substrate 10 on the Y2 side.

Figure 5A:
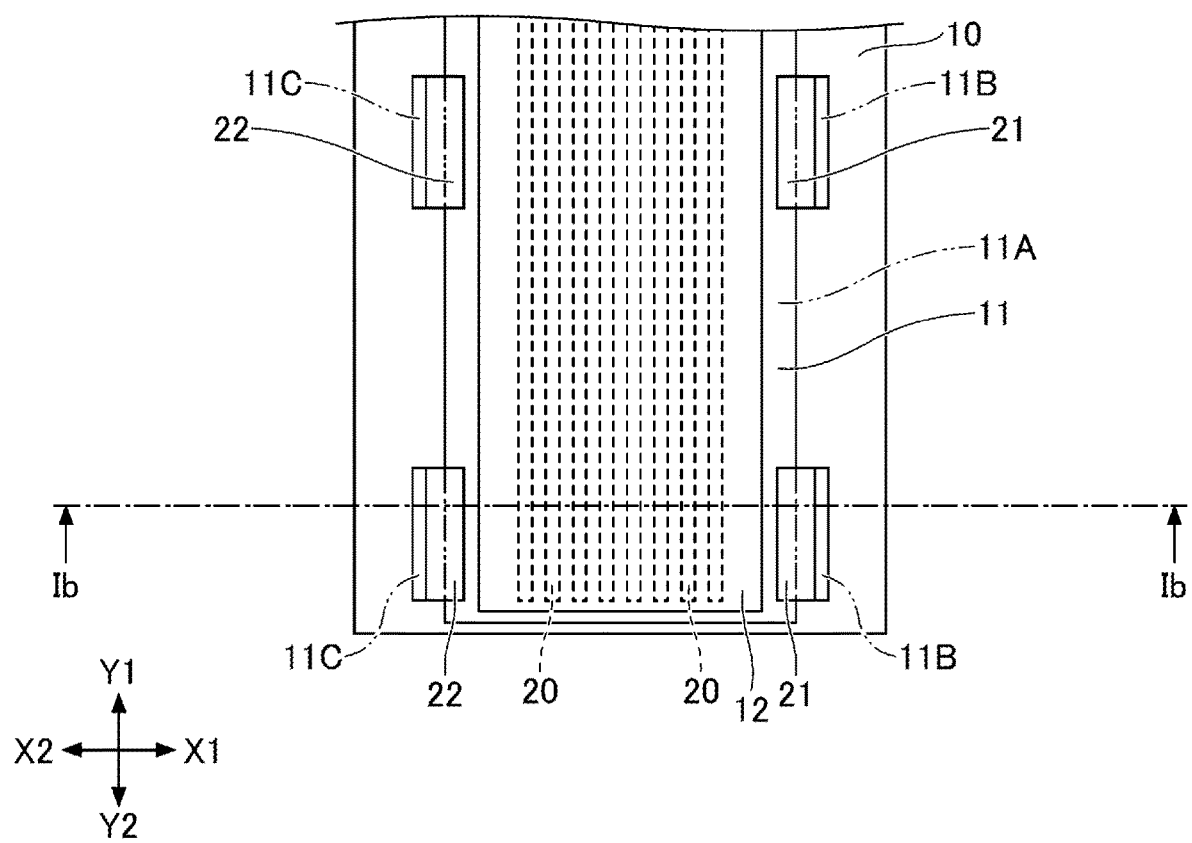
FIG. 5A and FIG. 5B are diagrams (part 3) illustrating the example of the method for manufacturing the optical connector according to one embodiment.
Figure 5B:
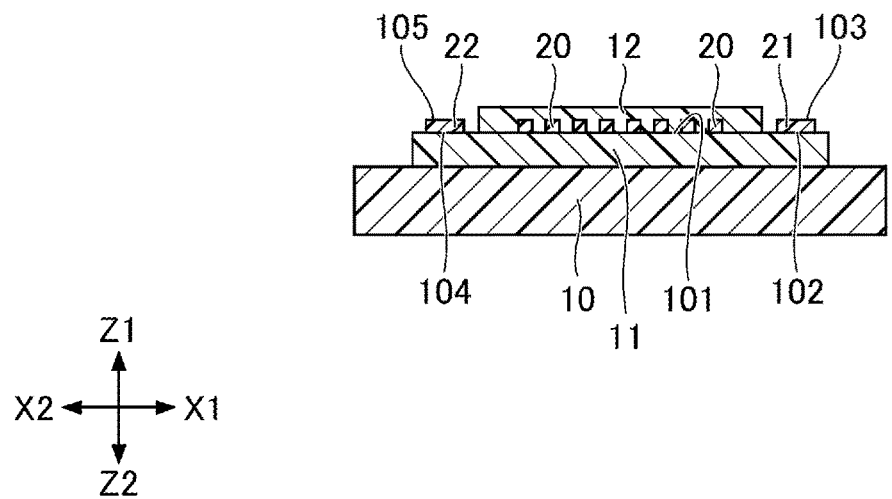

Thereafter, as illustrated in FIG. 5A and FIG. 5B, the upper clad layer 12 covering the core layer 20 is formed on the one surface 101 of the lower clad layer 11, so that the first contact layer 21 and the second contact layer 22 are exposed from the upper clad layer 12. The upper clad layer 12 can be formed by coating, exposing, and developing a resin, for example. At this point in time, the end surface of the upper clad layer 12 on the Y2 side is closer to the Y1 side than the end surface of the base portion 11A of the lower clad layer 11 on the Y2 side, and is closer to the Y1 side than the end surface of the substrate 10 on the Y2 side. The end surface of the upper clad layer 12 on the Y2 side is closer to the Y2 side than the end surface of the core layer 20 on the Y2 side.

Figure 6A:
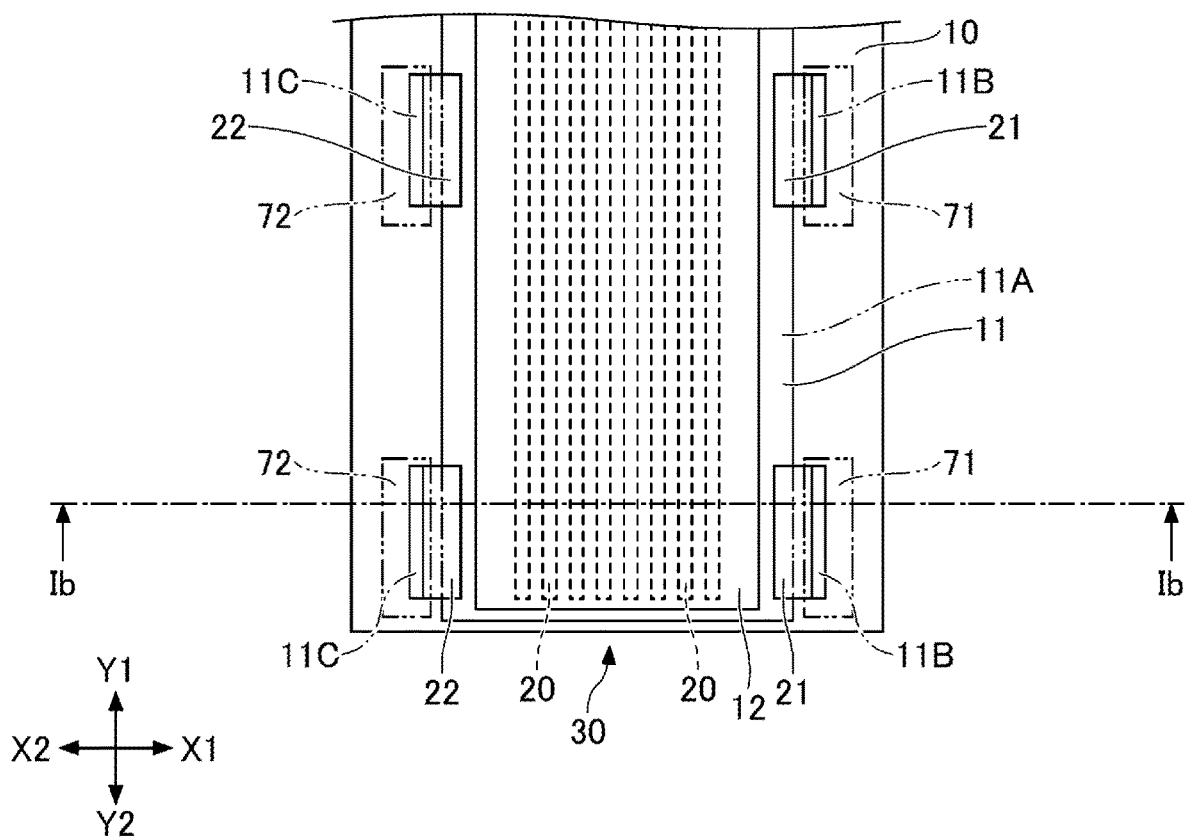
FIG. 6A and FIG. 6B are diagrams (part 4) illustrating the example of the method for manufacturing the optical connector according to one embodiment.
Figure 6B:
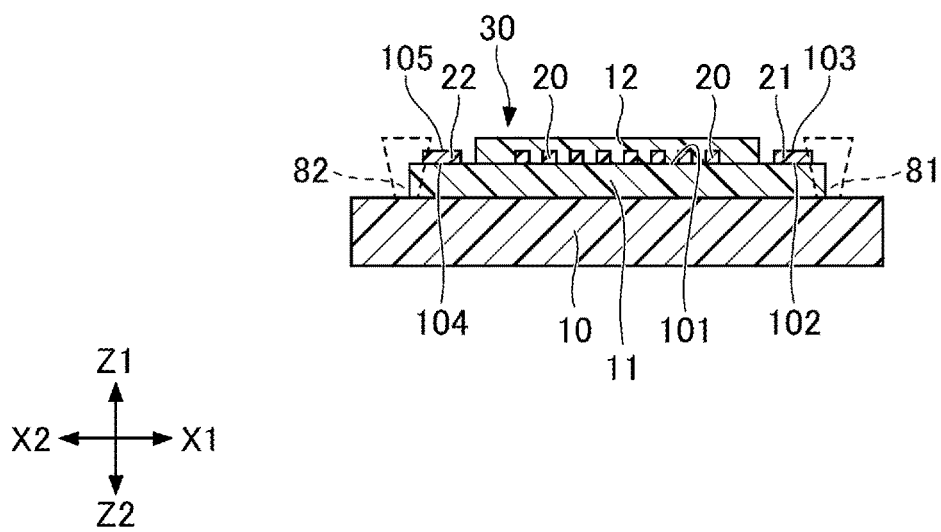

Next, as illustrated in FIG. 6A and FIG. 6B, two rectangular areas 71, including the side surface of the first contact area 11B on the X1 side and the side surface of the first contact layer 21 on the X1 side, are irradiated with a laser beam 81 using an excimer laser from a direction perpendicular to the one surface 101. Further, two rectangular areas 72, including the side surface of the second contact area 11C on the X2 side and the side surface of the second contact layer 22 on the X2 side, are irradiated with a laser beam 82 using an excimer laser from the direction perpendicular to the one surface 101. The laser beam emitted from the excimer laser has a beam shape that is inclined by 7° from the irradiating direction and narrows. For example, a KrF excimer laser or an ArF excimer laser can be used as the excimer laser. For example, on a plane including the one surface 103 of the first contact layer 21 and the one surface 105 of the second contact layer 22, a size of the areas 71 and 72 in the X1-X2 direction is 0.2 mm, and the size of the areas 71 and 72 in the Y1-Y2 direction is 0.6 mm.

Figure 7A:
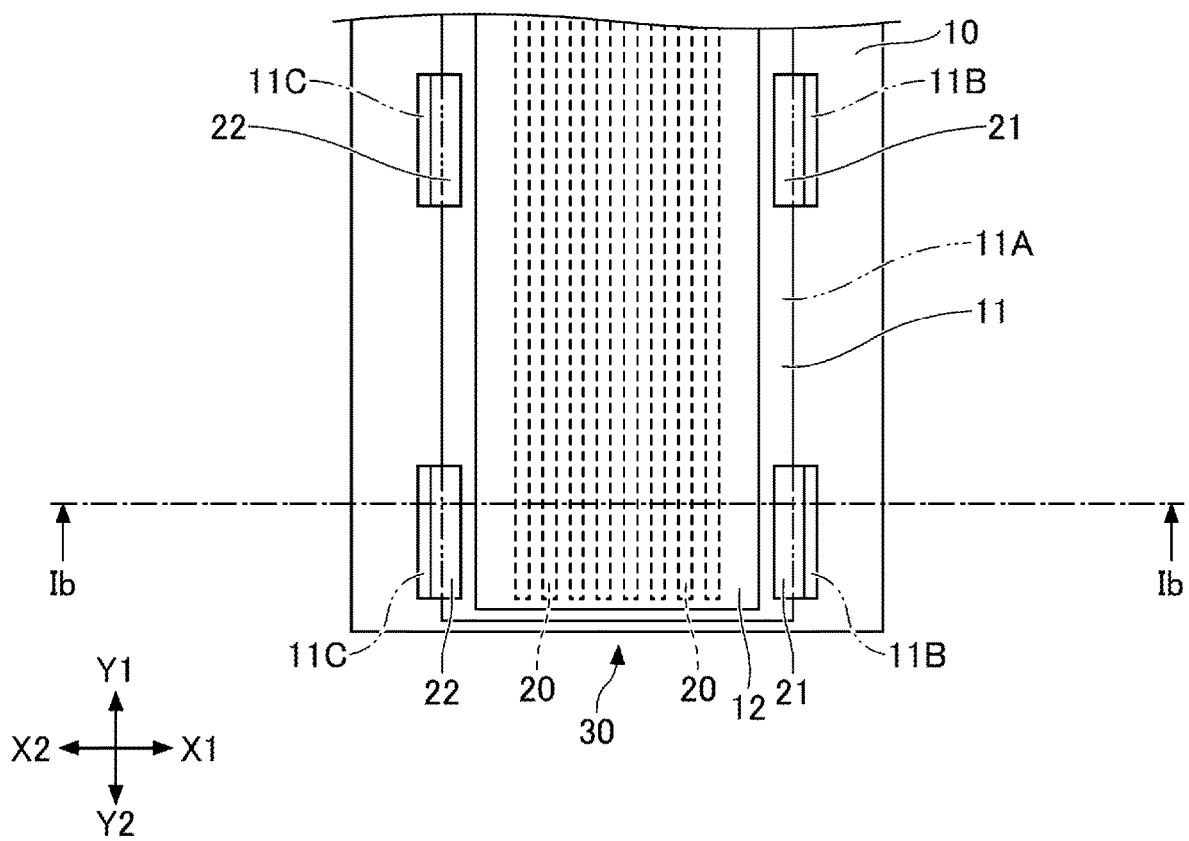
FIG. 7A and FIG. 7B are diagrams (part 5) illustrating the example of the method for manufacturing the optical connector according to one embodiment.
Figure 7B:
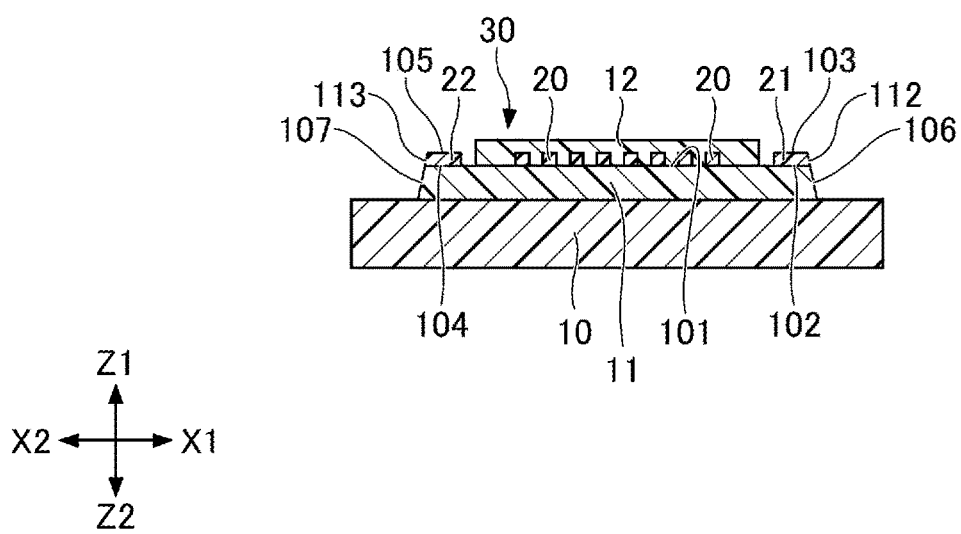
Figure 8A:
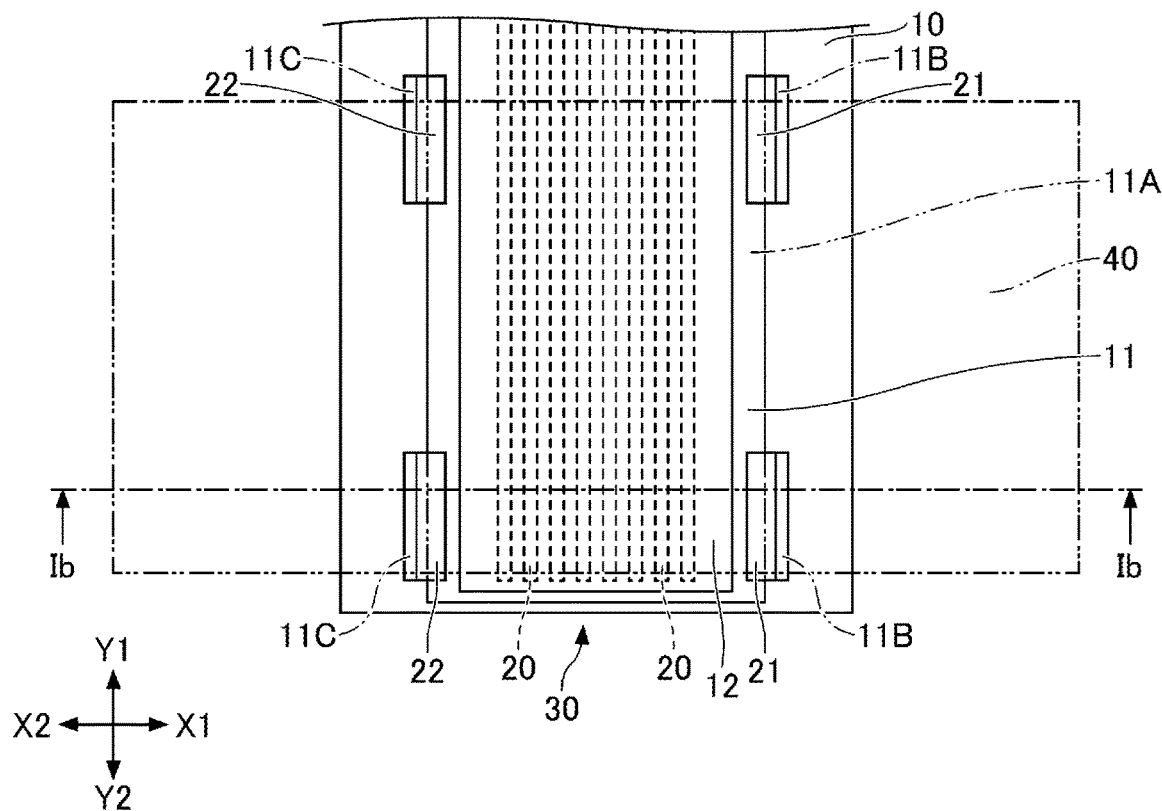
FIG. 8A and FIG. 8B are diagrams (part 6) illustrating the example of the method for manufacturing the optical connector according to one embodiment.

As a result of the irradiating the laser beam 81, as illustrated in FIG. 7A and FIG. 7B, the side surface 106 is formed in the first contact area 11B, and the side surface 112 is formed in the first contact layer 21. As a result of the irradiation with the laser beam 82, as illustrated in FIG. 7A and FIG. 7B, a side surface 107 is formed in the second contact area 11C, and a side surface 113 is formed in the second contact layer 22. The interior angle θ1 between the one surface 101 and the side surface 106 of the lower clad layer 11 is 97°, and the interior angle θ1 between the one surface 101 and the side surface 107 of the lower clad layer 11 is 97°. In addition, the widths of the one surface 103 of the first contact layer 21 and the one surface 105 of the second contact layer 22 are 0.2 mm, and the widths of the first contact area 11B and the second contact area 11C are slightly less than 0.1 mm.

The waveguide member 30 is formed in the manner described above.

Figure 8B:
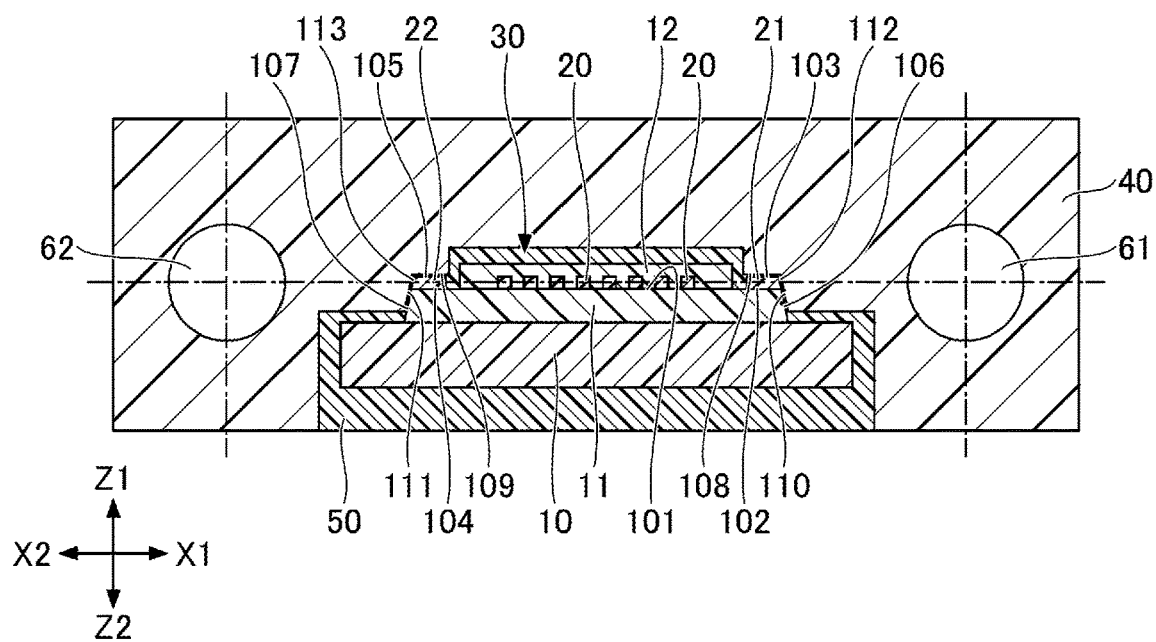
Figure 9A:
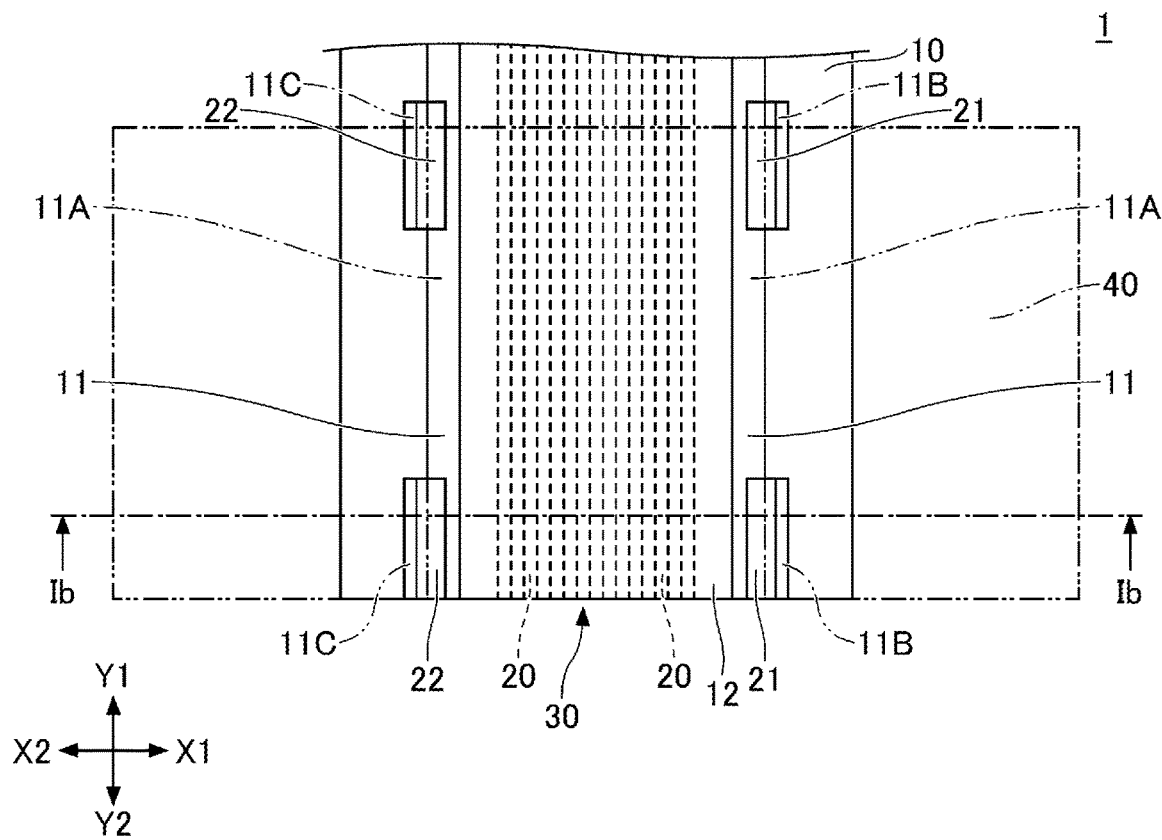
FIG. 9A and FIG. 9B are diagrams (part 7) illustrating the example of the method for manufacturing the optical connector according to one embodiment.

As illustrated in FIG. 8A and FIG. 8B, the holding member 40 is prepared separately from the waveguide member 30. The holding member 40 can be formed by molding using a metal mold, for example. Then, the waveguide member 30 is accommodated inside the groove 45 of the holding member 40. At this point in time, the holding member 40 is guided by the concave portion 42 of the groove 45, the surface 103 of the first contact layer 21 makes direct contact with the bottom surface 108 of the concave portion 42, and the surface 104 of the second contact layer 22 makes direct contact with the bottom surface 109 of the concave portion 42. Moreover, the side surface 106 of the lower clad layer 11 make direct contact with the inner wall surface 110 of the concave portion 42, and the side surface 107 of the lower clad layer 11 makes direct contact with the inner wall surface 111 of the concave portion 42. The side surface 112 of the first contact layer 21 may make direct contact with the inner wall surface 110 of the concave portion 42, and the side surface 113 of the second contact layer 22 may make direct contact with the inner wall surface 111 of the concave portion 42.

Thereafter, the adhesive 50 is provided inside the groove 45, and the waveguide member 30 and the holding member 40 are fixed to each other by the adhesive 50.

Figure 9B:
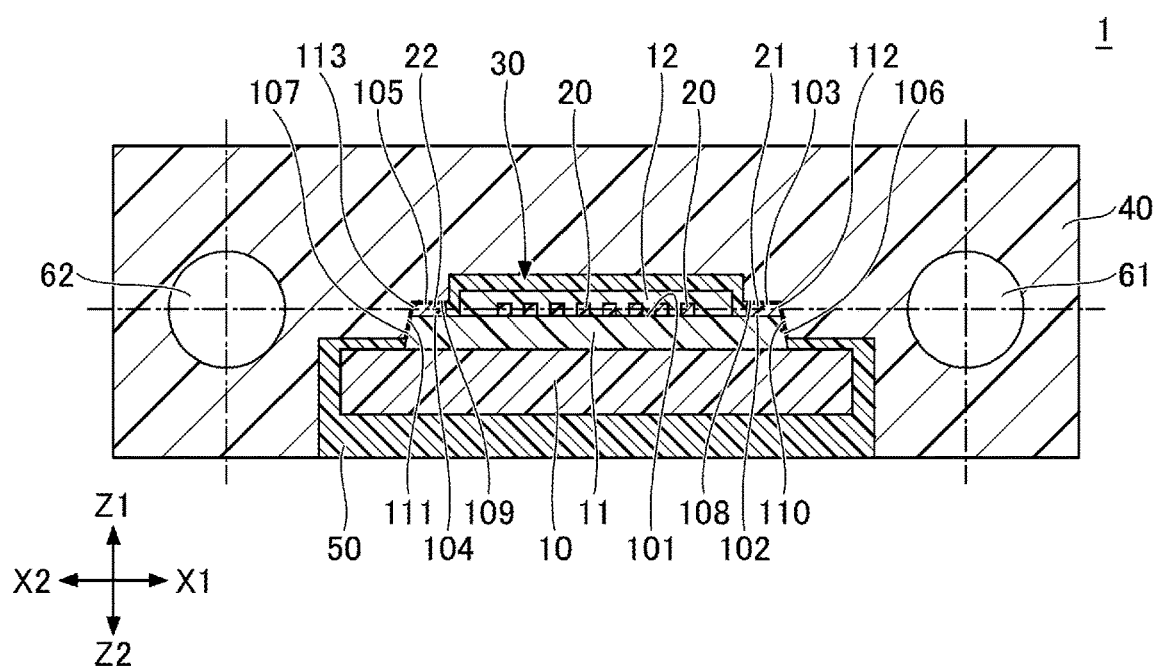

Next, as illustrated in FIG. 9A and FIG. 9B, the end surfaces of the holding member 40, the upper clad layer 12, the first contact layer 21, the second contact layer 22, the core layer 20, the lower clad layer 11, and the substrate 10 on the Y2 side are polished so as to coincide with one another.

The optical connector 1 according to one embodiment can be manufactured in the manner described above.

As described above, in the optical connector 1, when accommodating the waveguide member 30 inside the holding member 40, the waveguide member 30 is guided by the concave portion 42, the surface 103 makes direct contact with the bottom surface 108, the surface 104 makes direct contact with the bottom surface 109, the side surface 106 makes direct contact with the inner wall surface 110, and the side surface 107 makes direct contact with the inner wall surface 111. For this reason, the waveguide member 30 does not move further toward the Z1 side, and the position of the waveguide member 30 in the X1-X2 direction is constrained in a self aligning manner. Accordingly, a high alignment accuracy can simply be obtained. For example, the alignment can be performed with an error of 2 µm or less. Hence, the optical connector 1 is particularly suitable for a single mode transmission. The optical connector 1 can be used as a polymer waveguides connected with mechanically transferable connector (PMT optical connector), for example.

In a case where the optical connector 1 is used for the single mode transmission, the core layer 20 may have a rectangular shape with a side having a length of 10 µm or less in the cross sectional view perpendicular to the longitudinal direction. The core layer 20 may have a rectangular shape with a side having a length of 5 µm or less.

The laser beam 81 is irradiated while checking the position of the first contact layer 21, and the laser beam 82 is irradiated while checking the position of the second contact layer 22. In a case where the core layer 20, the first contact layer 21, and the second contact layer 22 are formed through simultaneous exposure using the same exposure mask, an excellent positional accuracy (or alignment accuracy) can be obtained among the core layer 20, the first contact layer 21, and the second contact layer 22. For this reason, when the laser beam 81 is irradiated while checking the position of the first contact layer 21, an excellent positional accuracy can also be obtained between the core layer 20 and the side surface 106 of the lower clad layer 11. Similarly, when the laser beam 82 is irradiated while checking the position of the second contact layer 22, an excellent positional accuracy can also be obtained between the core layer 20 and the side surface 107 of the lower clad layer 11.

The side surfaces 112 and 106 may be formed by irradiating the laser beam 81 a plurality of times. In this case, the positional accuracy (or alignment accuracy) may be checked after irradiating the laser beam 81 one or a plurality of times, and if a positional error is present, an irradiating position of the laser beam 81 may be adjusted. Similarly, the side surfaces 113 and 107 may be formed by irradiating the laser beam 82 a plurality of times. In this case, the positional accuracy may be checked after irradiating the laser beam 82 one or a plurality of times, and if a positional error is present, an irradiating position of the laser beam 82 may be adjusted.

Guide pins are inserted into the through holes 61 and 62 when aligning the optical connector 1 with another optical connector to which the optical connector 1 is to be connected.

A material used for the lower clad layer 11, the upper clad layer 12, and the core layer 20 is not particularly limited, and an epoxy-based resin, an acrylic-based resin, a polyimide-based resin, or the like may be used for the lower clad layer 11, the upper clad layer 12, and the core layer 20.

Accordingly to each of the embodiments described above, it is possible to simply obtain a high alignment accuracy.

Various aspects of the subject-matter described herein may be set out non-exhaustively in the following numbered clauses:

1. A method for manufacturing an optical connector, comprising:
   preparing a waveguide member; and
   fixing the waveguide member to a holding member, wherein
   the preparing includes
      forming a core layer, and a first contact layer and a second contact layer sandwiching the core layer in a cross sectional view perpendicular to a longitudinal direction on a first surface of a first clad layer having the longitudinal direction and the first surface,
      forming a second clad layer covering the core layer on the first surface such that the first contact layer and the second contact layer are exposed from the second clad layer, and
      forming a sixth surface on the first contact layer side when viewed from the second clad layer and a seventh surface on the second contact layer side when viewed from the second clad layer in the first clad layer by processing the first clad layer using an excimer laser,
   the first contact layer includes a second surface in contact with the first surface, and a third surface opposite to the second surface,
   the second contact layer includes a fourth surface in contact with the first surface, and a fifth surface opposite to the second surface,
   the sixth surface and the seventh surface are continuous with the first surface and form an obtuse angle with the first surface,
   the holding member includes an eighth surface directly contacting the third surface, a ninth surface directly contacting the fifth surface, a tenth surface directly contacting the sixth surface, and an eleventh surface directly contacting the seventh surface, and
   the fixing includes
      causing the third surface to make direct contact with the eighth surface,
      causing the fifth surface to make direct contact with the ninth surface, causing the sixth surface to make direct contact with the tenth surface, and causing the seventh surface to make direct contact with the eleventh surface.

2. The method for manufacturing the optical connector according to clause 1, wherein the first clad layer, the core layer, and the second clad layer are made of a resin, respectively.

3. The method for manufacturing the optical connector according to clause 1 or 2, wherein an interior angle between the first surface and the sixth surface, and an interior angle between the first surface and the seventh surface, are both 97°.

4. The method for manufacturing the optical connector according to any one of clauses 1 to 3, wherein a material used for the core layer, a material used for the first contact layer, and a material used for the second contact layer are identical materials.

5. The method for manufacturing the optical connector according to any one of clauses 1 to 4, wherein the fixing fixes the waveguide member and the holding member to each other using an adhesive.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical connector comprising:
   a waveguide member; and
   a holding member to which the waveguide member is fixed, wherein
   the waveguide member includes
      a first clad layer having a longitudinal direction and a first surface,
      a core layer provided on the first surface,
      a second clad layer provided on the first surface and covering the core layer, and
      a first contact layer and a second contact layer provided on the first surface, sandwiching the core layer therebetween in a cross sectional view perpendicular to the longitudinal direction, and exposed from the second clad layer,
   the first contact layer includes a second surface making contact with the first surface, and a third surface opposite to the second surface,
   the second contact layer includes a fourth surface making contact with the first surface, and a fifth surface opposite to the second surface,
   the first clad layer includes a sixth surface, on a side of the first contact layer viewed from the second clad layer, continuous with the first surface, and forming an obtuse angle with the first surface, and a seventh surface, on a side of the second contact layer when viewed from the second clad layer, continuous with the first surface, and forming an obtuse angle with the first surface, and
   the holding member includes
      an eighth surface making direct contact with the third surface,
      a ninth surface making direct contact with the fifth surface,
      a tenth surface making direct contact with the sixth surface, and
      an eleventh surface making direct contact with the seventh surface.

2. The optical connector as claimed in claim 1, wherein the waveguide member includes a substrate making contact with a surface of the first clad layer opposite to the first surface.

3. The optical connector as claimed in claim 1, wherein
   the first contact layer has a twelfth surface making contact with the tenth surface, and
   the second contact layer has a thirteenth surface making contact with the eleventh surface.

4. The optical connector as claimed in claim 1, wherein the first clad layer, the core layer, and the second clad layer are made of a resin, respectively.

5. The optical connector as claimed in claim 1, wherein an interior angle between the first surface and the sixth surface, and an interior angle between the first surface and the seventh surface, are both 97°.

6. The optical connector as claimed in claim 1, wherein a material used for the core layer, a material used for the first contact layer, and a material used for the second contact layer are identical materials.

7. The optical connector as claimed in claim 1, further comprising:
   an adhesive configured to fix the waveguide member and the holding member to each other.

8. The optical connector as claimed in claim 1, wherein the core layer has a rectangular shape with a side having a length of 10 μm or less in a cross sectional view perpendicular to the longitudinal direction.

* * * * *